(12) United States Patent
Lee et al.

(10) Patent No.: US 11,015,530 B2
(45) Date of Patent: May 25, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventors: Donggon Lee, Seoul (KR); Moonsoo Cho, Seoul (KR)

(*) Notice: Subject to any disclaimer, the term of this patent is extended or adjusted under 35 U.S.C. 154(b) by 269 days.

(21) Appl. No.: 16/159,690

(22) Filed: Oct. 14, 2018

(65) Prior Publication Data

US 2019/0128188 A1    May 2, 2019

(30) Foreign Application Priority Data

Oct. 30, 2017    (KR) .......................... 10-2017-0142542

(51) Int. Cl.
*F02C 7/18*    (2006.01)
*F23R 3/16*    (2006.01)
*F23R 3/28*    (2006.01)

(52) U.S. Cl.
CPC .................. *F02C 7/18* (2013.01); *F23R 3/16* (2013.01); *F23R 3/283* (2013.01); *F23R 3/286* (2013.01);
(Continued)

(58) Field of Classification Search
None
See application file for complete search history.

(56) References Cited

U.S. PATENT DOCUMENTS 8,281,596 B1 * 10/2012 Rohrssen ................ F23R 3/002
60/747
8,756,934 B2 * 6/2014 Melton .................... F23R 3/28
60/737

(Continued)

FOREIGN PATENT DOCUMENTS

CN    203880748 U    10/2014
CN    204943566 U    1/2016
(Continued)

OTHER PUBLICATIONS

A Korean Office Action dated Feb. 18, 2019 in connection with Korean Patent Application No. 10-2017-0142542 which corresponds to the above-referenced U.S. application.
(Continued)

*Primary Examiner* — Steven M Sutherland
*Assistant Examiner* — Rodolphe Andre Chabreyrie

(57) ABSTRACT

A combustor includes a fuel injector to inject fuel; a cooling passage configured to pass compressed air for cooling an outer surface of a liner forming a combustion chamber for containing combustion gas; and a nozzle part that is coupled to the liner and has a rear surface facing the combustion chamber, the nozzle part configured to mix the compressed air with the fuel from the fuel injector and to discharge some of the compressed air in the cooling passage to the rear surface in order to block an introduction of the combustion gas into the nozzle part. Before the compressed air introduced through air introduction holes formed in a nozzle casing is discharged through through-holes formed in a nozzle cap, some of the compressed air may be introduced through bypass holes formed in a bypass tube and then discharged to the combustion chamber through the gap.

20 Claims, 7 Drawing Sheets

(52) U.S. Cl.
CPC ...... *F05D 2220/32* (2013.01); *F05D 2240/35* (2013.01); *F05D 2240/57* (2013.01); *F05D 2260/232* (2013.01); *F23R 2900/00012* (2013.01); *F23R 2900/03043* (2013.01); *F23R 2900/03044* (2013.01)

(56) References Cited

U.S. PATENT DOCUMENTS

| | | | | |
|---|---|---|---|---|
| 9,366,437 | B2* | 6/2016 | Melton | F23R 3/286 |
| 10,359,195 | B2* | 7/2019 | Roh | F23D 11/38 |
| 10,508,557 | B2* | 12/2019 | Jung | F01D 5/3015 |
| 10,663,170 | B2* | 5/2020 | Abu-Irshaid | F23R 3/10 |
| 2013/0219912 | A1* | 8/2013 | Berry | F23R 3/286 |
| | | | | 60/779 |
| 2013/0283802 | A1* | 10/2013 | Kim | F23R 3/425 |
| | | | | 60/737 |
| 2014/0116060 | A1* | 5/2014 | Melton | F23R 3/283 |
| | | | | 60/755 |
| 2015/0241065 | A1* | 8/2015 | Hughes | F23R 3/286 |
| | | | | 60/737 |
| 2015/0285502 | A1* | 10/2015 | DiCintio | B22F 5/10 |
| | | | | 60/737 |
| 2016/0146460 | A1* | 5/2016 | Stewart | F23D 17/00 |
| | | | | 60/737 |
| 2017/0082290 | A1* | 3/2017 | Stewart | F23R 3/343 |
| 2018/0363906 | A1* | 12/2018 | Bailey | F23R 3/286 |
| 2018/0363911 | A1* | 12/2018 | Graham | F23R 3/36 |
| 2019/0056112 | A1* | 2/2019 | Natarajan | F23R 3/46 |
| 2019/0086088 | A1* | 3/2019 | Stevens | F23R 3/14 |

FOREIGN PATENT DOCUMENTS

| | | |
|---|---|---|
| EP | 2657608 A2 | 10/2013 |
| JP | H06-002851 A | 1/1994 |
| JP | 2015-524911 A | 8/2015 |
| JP | 2015-206584 A | 11/2015 |
| KR | 2000-0071500 A | 11/2000 |
| KR | 2006-0087872 A | 8/2006 |
| KR | 10-0674288 B1 | 1/2007 |

OTHER PUBLICATIONS

An European Search Report dated Dec. 6, 2018 in connection with European Patent Application No. 18201090.0 which corresponds to the above-referenced U.S. application.

* cited by examiner

COMBUSTOR AND GAS TURBINE INCLUDING THE SAME

CROSS-REFERENCE TO RELATED APPLICATIONS

This application claims priority to Korean Patent Application No. 10-2017-0142542, filed on Oct. 30, 2017, the disclosure of which is incorporated herein by reference in its entirety.

BACKGROUND OF THE INVENTION

Field of the Invention

Exemplary embodiments of the present disclosure relate to a combustor and a gas turbine including the same.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

This gas turbine typically includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and burns the mixture. Combustion gas produced by the combustion is discharged to the turbine. Turbine blades in the turbine are rotated by the combustion gas, thereby generating power. The generated power is used in various fields, such as generating electric power and driving machines.

The combustor is provided with a combustion duct assembly that transmits high-temperature combustion gas produced in a combustion chamber to the turbine. The combustion duct assembly includes a liner and a transition piece connected to the liner to guide the produced combustion gas to the turbine. The combustor includes a nozzle part and a head part, which are installed over the liner. The head part includes a plurality of fuel injectors supported by an end plate, and the nozzle part includes a plurality of nozzles supported by a nozzle casing, a nozzle shroud, and the like.

In this case, the surface of the nozzle part faces the high-temperature environment of the combustion chamber and is thus always directly exposed to the combustion gas in the combustion chamber and to its high temperatures. Hence, if some of the combustion gas is introduced into the nozzle part through a minute gap, the durability of the nozzle part may be deteriorated.

SUMMARY OF THE INVENTION

An object of the present disclosure is to provide a combustor capable of blocking the introduction of combustion gas into a nozzle part, and a gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a combustor may include a fuel injector to inject fuel; a cooling passage configured to pass compressed air for cooling an outer surface of a liner forming a combustion chamber for containing combustion gas; and a nozzle part that is coupled to the liner and has a rear surface facing the combustion chamber, the nozzle part configured to mix the compressed air with the fuel from the fuel injector and to discharge some of the compressed air in the cooling passage to the rear surface in order to block an introduction of the combustion gas into the nozzle part.

The nozzle part may include a nozzle installed at one end of the fuel injector and surrounded by a nozzle shroud for introducing the compressed air from the cooling passage into a space between the nozzle and the nozzle shroud in which the compressed air and the fuel are mixed; a nozzle casing for supporting the nozzle shroud at one end and including an open side at the other end, the nozzle casing further including a side in which an air introduction hole is formed; a nozzle cap installed in the open side of the nozzle casing between the nozzle shroud and the nozzle casing, the nozzle cap having a plurality of through-holes formed to discharge the compressed air introduced through the air introduction hole; and an annular bypass tube installed between the nozzle shroud and the nozzle cap to form a gap between the nozzle shroud and an inner circumferential surface of the nozzle cap, the annular bypass tube having a bypass hole formed to discharge to the gap some of the compressed air introduced through the air introduction hole.

The nozzle shroud may have a tubular shape that is longer than the nozzle, and the installed nozzle may have one end concealed within the nozzle shroud.

The nozzle part may further include a swirler installed inside the nozzle shroud.

The combustor may further include a plurality of fixing brackets formed on an outer circumference of the nozzle casing to be radially coupled inside the combustor casing.

The may further include a spring seal provided on an outer circumference of the nozzle casing to be pressed into the liner.

The air introduction hole may consists of a plurality of air introduction holes circumferentially formed in the nozzle casing.

The combustor may further include a holder interposed between the nozzle cap and the nozzle casing to fix the nozzle cap inside the open side of the nozzle casing.

The nozzle cap may have a flat surface facing the combustion chamber, and the through-holes may be formed throughout the flat surface.

The annular bypass tube may be supported inside the nozzle cap.

The bypass hole may consist of a plurality of bypass holes circumferentially formed in the annular bypass tube.

The annular bypass hole may be inclined with respect to a longitudinal direction of the bypass tube.

In accordance with another aspect of the present disclosure, a gas turbine may include a compressor to compress air, a combustor to produce combustion gas by mixing fuel with the compressed air and combusting the mixture, and a turbine configured to be rotated by the combustion gas to generate power. The combustor of the gas turbine may include the fuel injector of the above combustor; the cooling passage of the above combustor; and a nozzle part including a nozzle installed at one end of the fuel injector and surrounded by a nozzle shroud for introducing the compressed air from the cooling passage into a space between the nozzle and the nozzle shroud in which the compressed air and the fuel are mixed; a nozzle casing for supporting the nozzle shroud at one end and including an open side at the other end, the nozzle casing further including a side in which an air introduction hole is formed; a nozzle cap installed in the open side of the nozzle casing between the nozzle shroud and the nozzle casing, the nozzle cap having a plurality of through-holes formed to discharge the compressed air introduced through the air introduction hole; and an annular bypass tube installed between the nozzle shroud and the nozzle cap to form a gap between the nozzle shroud and an inner circumferential surface of the nozzle cap, the annular bypass tube having a bypass hole formed to discharge to the gap some of the compressed air introduced through the air introduction hole.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
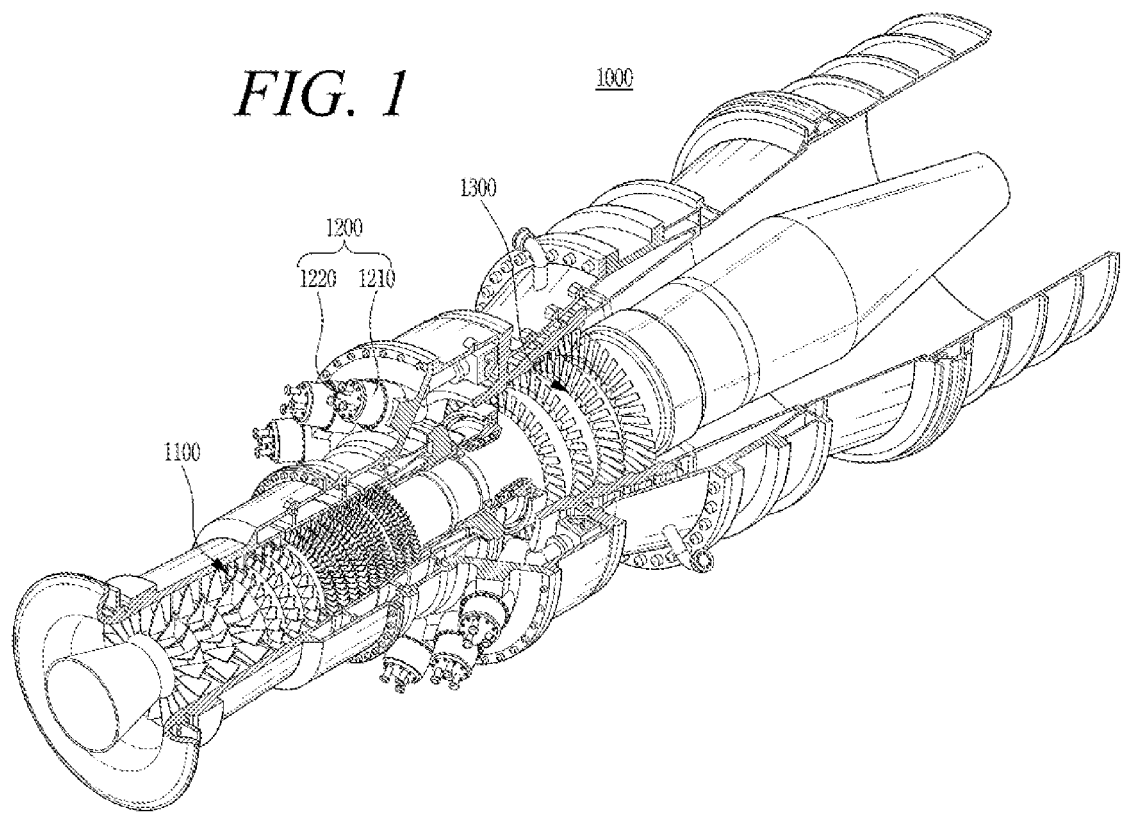
FIG. 1 is a cutaway perspective view of a gas turbine including a combustor according to an embodiment of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
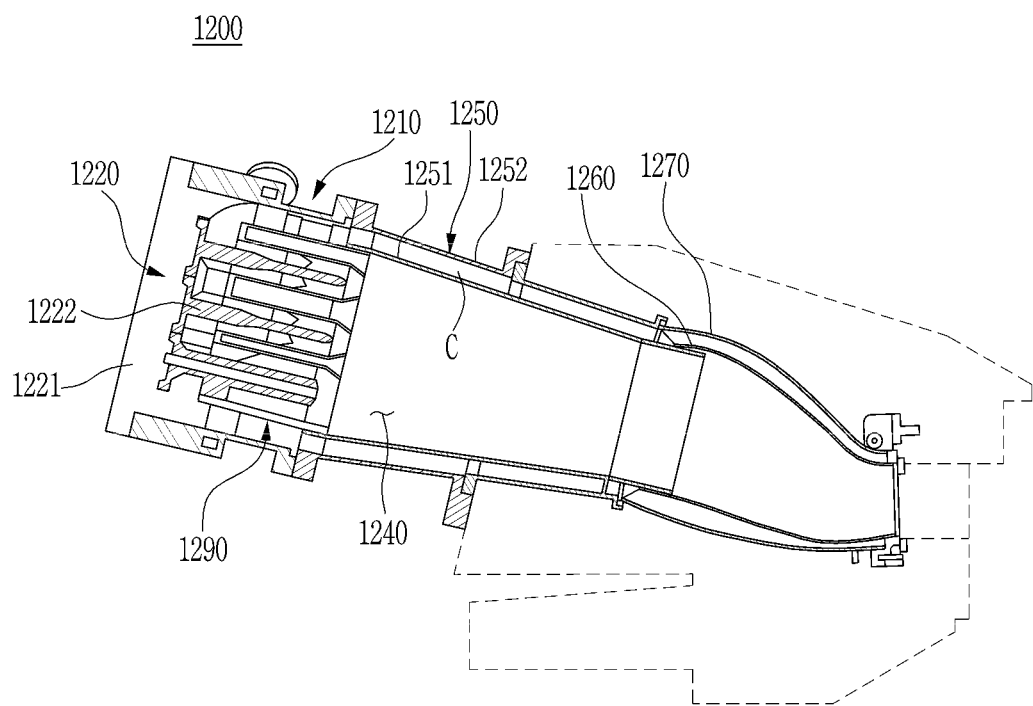
FIG. 2 is a cross-sectional view of a combustor according to the embodiment of the present disclosure.

FIG. 1 illustrates the structure of a gas turbine 1000 according to the present disclosure. FIG. 2 illustrates a combustor 1200 included in the gas turbine of FIG. 1.

Referring to FIGS. 1 and 2, a compressor 1100 of the gas turbine 1000 serves to suck and compress air, and mainly serves to supply cooling air to a high-temperature region required for cooling in the gas turbine 1000 while supplying combustion air to the combustor 1200. Since the air sucked into the compressor 1100 is subject to an adiabatic compression process, the pressure and temperature of the air passing through the compressor 1100 increase. The compressor 1100 of the large gas turbine 1000 as in FIG. 1 is a multistage axial compressor configured such that a large amount of air is compressed to a desired compression ratio while passing through each stage.

The combustor 1200 mixes the compressed air, which is supplied from the outlet of the compressor 1100, with fuel for isobaric combustion to produce high-energy combustion gas. The combustor 1200, which in actuality consists of a plurality of combustors 1200 arranged around a casing of the gas turbine 100, is disposed downstream of the compressor 1100. Each combustor 1200 includes a plurality of head parts 1220 arranged in an annular combustor casing 1210 and supported by an end plate 1221. Each head part 1220 includes a plurality of fuel injectors 1222, and the fuel supplied from the fuel injectors 1222 is mixed with air at an appropriate rate to be suitable for combustion.

The gas turbine 1000 may use gas fuel, liquid fuel, or composite fuel combining them. It is important to make a combustion environment for reducing an amount of emission such as carbon monoxide or nitrogen oxide that is subject to legal regulations. Accordingly, pre-mixed combustion has been increasingly used in recent years in that it can accomplish uniform combustion to reduce emission by lowering a combustion temperature even though it is relatively difficult to control combustion.

In the pre-mixed combustion, compressed air is mixed with the fuel injected from the fuel injectors 1222 and then introduced into a combustion chamber 1240. When combustion is stable after pre-mixed gas is initially ignited by an igniter, the combustion is maintained by the supply of fuel and air.

The combustor 1200 needs to be suitably cooled since it operates at the highest temperature in the gas turbine 1000. Especially, a turbine inlet temperature (TIT) is very important in the gas turbine 1000 because the efficiency of the gas turbine 1000 is typically increased as the turbine inlet temperature becomes high. In addition, the increase of the turbine inlet temperature is advantageous for gas turbine combined power generation. For this reason, the gas turbine 1000 is also classified based on the turbine inlet temperature.

Ultimately, the temperature of combustion gas must be increased to increase the turbine inlet temperature. Accordingly, it is important that a combustion duct assembly, which forms the combustion chamber 1240 and passage of the combustor 1200 for the flow of hot combustion gas, be designed to be made of a high heat-resistant material and desirably cooled.

Compressed air flows along the outer surface of the combustion duct assembly, which connects the combustor 1200 to a turbine 1300 so that hot combustion gas flows through the combustion duct assembly, and is supplied to the fuel injectors 1222. In this process, the combustion duct assembly heated by the hot combustion gas is properly cooled.

The combustion duct assembly may consist of a liner 1250 and a transition piece and is formed by coupling the liner 1250 and the transition piece, which each have a double-tube structure, through an elastic support (not shown) provided to accommodate the effects of thermal expansion. In this case, the transition piece consists of an inner transition piece 1260 and an outer transition piece 1270. The inner transition piece 1260 connected to the liner 1250 is connected to the inlet of the turbine 1300 to guide hot combustion gas to the turbine 1300.

The liner 1250 is a tubular member connected to a nozzle part 1290, which will be described later, and defines an internal space forming the combustion chamber 1240. It is necessary to suitably cool the liner 1250 and the transition piece because their inner surfaces are in direct contact with hot combustion gas. To this end, a plurality of cooling holes or inlets (not shown) may be provided in the outer peripheral surfaces of the outer transition piece 1270 and the liner 1250. The number and arrangement of such cooling holes is not particularly limited and may be determined by design requirements.

The liner 1250 may consist of an inner liner 1251 forming the combustion chamber 1240, and an outer liner 1252 surrounding the inner liner 1251 to form a cooling passage C for the flow of compressed air introduced via cooling holes/inlets. The air introduced into the cooling passage C through the inlet holes may be compressed air supplied from the compressor 1100 of the gas turbine. While the outer liner 1252 is separated from the inner liner 1251, the inner liner 1251 is in direct contact with hot combustion gas produced in the combustion chamber 1240 so that heat is directly transferred from the combustion gas to the inner liner 1251.

The liner 1250 may be included within a casing can (not shown) and the compressed air produced in the compressor may be introduced into the casing can and then introduced into the cooling passage C through the inlet holes while flowing along the outer surface of the liner 1250. The compressed air flowing through the cooling passage C comes into contact with the inner liner 1251 and thus cools the inner liner 1251.

Figure 3:
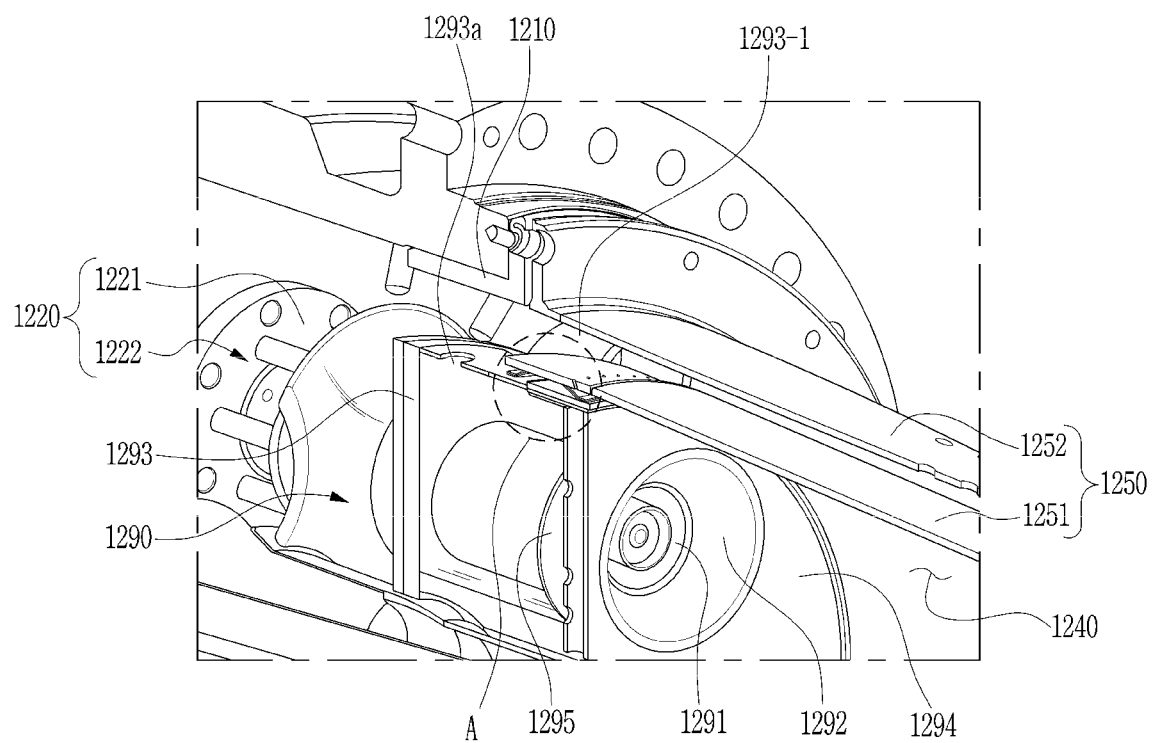
FIG. 3 is a perspective view of a portion of the combustor of FIG. 2.
Figure 4:
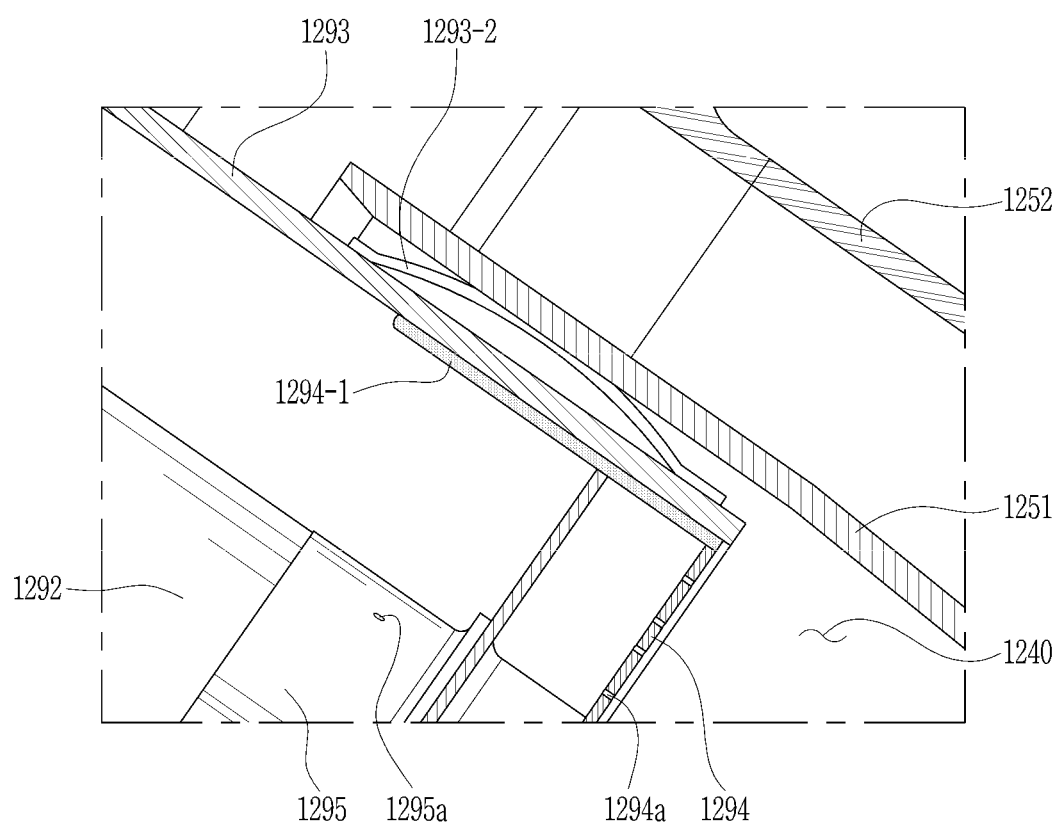
FIG. 4 is a section view of a region "A" of FIG. 3.
Figure 5:
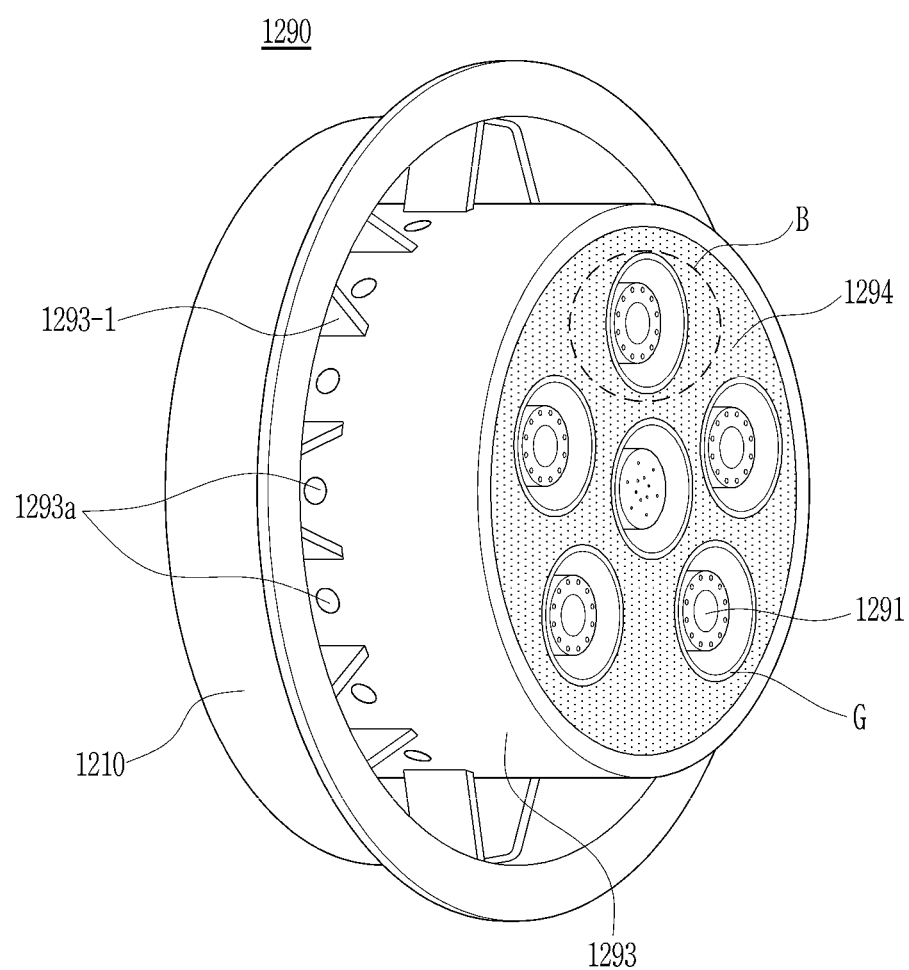
FIG. 5 is a perspective view of the nozzle part of the combustor of FIG. 3.

FIG. 3 illustrates a portion of the combustor of FIG. 2, and FIG. 4 is a section view of a region "A" of FIG. 3. Here, the individual fuel injectors 1222 are combined with the nozzle part 1290 to mix compressed air with fuel for injection. FIG. 5 illustrates the external appearance of the nozzle part 1290 in which a plurality of nozzles 1291 are arranged. The nozzle part 1290 has a rear side that faces the combustion chamber 1240 (FIG. 2).

Referring to FIGS. 3 to 5, the nozzle part 1290 includes the nozzles 1291, a nozzle shroud 1292, a nozzle casing 1293, a nozzle cap 1294, and an annular bypass tube 1295. Each nozzle 1291 is installed at one end of the fuel injectors 1222 and is surrounded by the nozzle shroud 1292 forming a compressed air inlet (facing the fuel injectors 1222, refer to FIG. 7) for introducing compressed air into a space between the nozzle 1291 and the nozzle shroud 1292 in which fuel is mixed with the compressed air. The nozzle casing 1293, which encloses the plurality of nozzles 1291, is coupled to the combustor casing 1210 while supporting the nozzle shroud 1292 at one end and has an open side at the other end. An air introduction hole 1293*a* is formed in the side of the nozzle casing 1293. The nozzle cap 1294 is installed in the open side of the nozzle casing 1293 and closes the open areas around the nozzle shroud 1292, between the nozzle shroud 1292 and the nozzle casing 1293. A plurality of through-holes 1294*a* are formed in the nozzle cap 1294 to discharge the compressed air introduced through the air introduction hole 1293*a*. The annular bypass tube 1295 is installed between the nozzle shroud 1292 and the nozzle cap 1294 to form a gap G around the nozzle shroud 1292, between the nozzle shroud 1292 and an inner circumferential surface of the nozzle cap 1294. A bypass hole 1295*a* is formed in the bypass tube 1295 to discharge to the gap G some of the compressed air introduced through the air introduction hole 1293*a* (refer to FIG. 6).

The end of the nozzle 1291 may be recessed to a certain depth so as to be concealed within the nozzle shroud 1292 to be protected from the hot gas produced by combustion. The configuration is not limited only to the double-tube shape illustrated in the drawings.

On the other hand, one end of the nozzle shroud 1292 has a tubular shape and may be slightly longer than the nozzle 1291, thereby enabling the nozzle 1291 to be restrictively protected from hot gas. The other end of the nozzle shroud 1292 is a portion for receiving compressed air and has a relatively large inner diameter. A swirler (not shown) may be additionally installed inside the other end of the nozzle shroud 1292.

Referring to FIG. 5, the nozzle casing 1293 has an outer circumference on which a plurality of fixing brackets 1293-1 are formed and radially coupled inside the combustor casing 1210. The air introduction hole 1293*a* may consist of a plurality of air introduction holes circumferentially (radially) formed in the nozzle casing 1293, but the present disclosure is not limited thereto.

The outer circumference of the nozzle casing 1293 is provided with a spring seal 1293-2 that presses into the inner liner 1251 as shown in FIG. 4. Here, the nozzle cap 1294 is fixed inside the open end of the nozzle casing 1293 by a holder 1294-1 interposed therebetween. The nozzle cap 1294 has a flat surface, throughout which are formed the through-holes 1294*a*, facing the combustion chamber 1240 so that compressed air is supplied to the combustion chamber 1240 through the through-holes 1294*a* to protect the nozzle part 1290 from hot gas.

Figure 6:
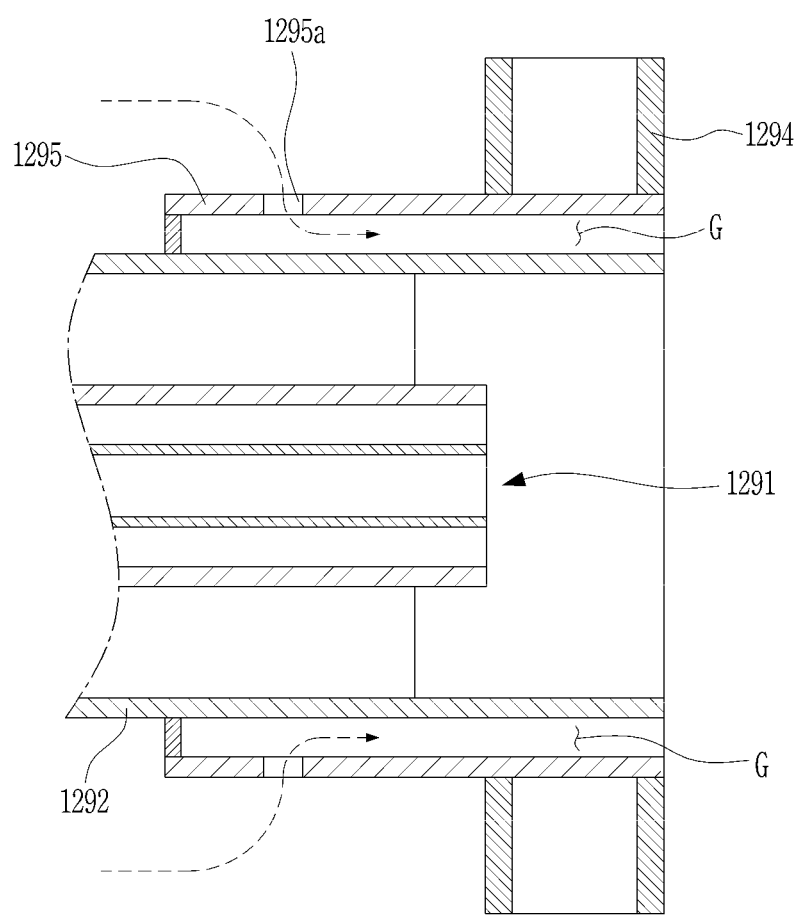
FIG. 6 is a section view of a region "B" of FIG. 5.

FIG. 6 is a sectional view of region "B" of FIG. 5.

As illustrated in FIG. 6, the bypass tube 1295 may be supported inside the inner circumferential surface of the nozzle cap 1294. The bypass hole 1295*a* formed in the bypass tube 1295 may consists of a plurality of bypass holes 1295*a* arranged circumferentially around the bypass tube 1295 for the introduction of some of the compressed air to be discharged through the through-holes 1294*a* of the nozzle cap 1294. The compressed air introduced through the bypass holes 1295*a* may be discharged to the combustion chamber 1240 through the gap G formed outside the nozzle shroud 1292. To facilitate airflow, the bypass holes 1295*a* may be inclined at a certain angle with respect to the longitudinal direction of the bypass tube 1295.

Hereinafter, the operation of the combustor according to the embodiment of the present disclosure will be described with reference to FIG. 7.

Figure 7:
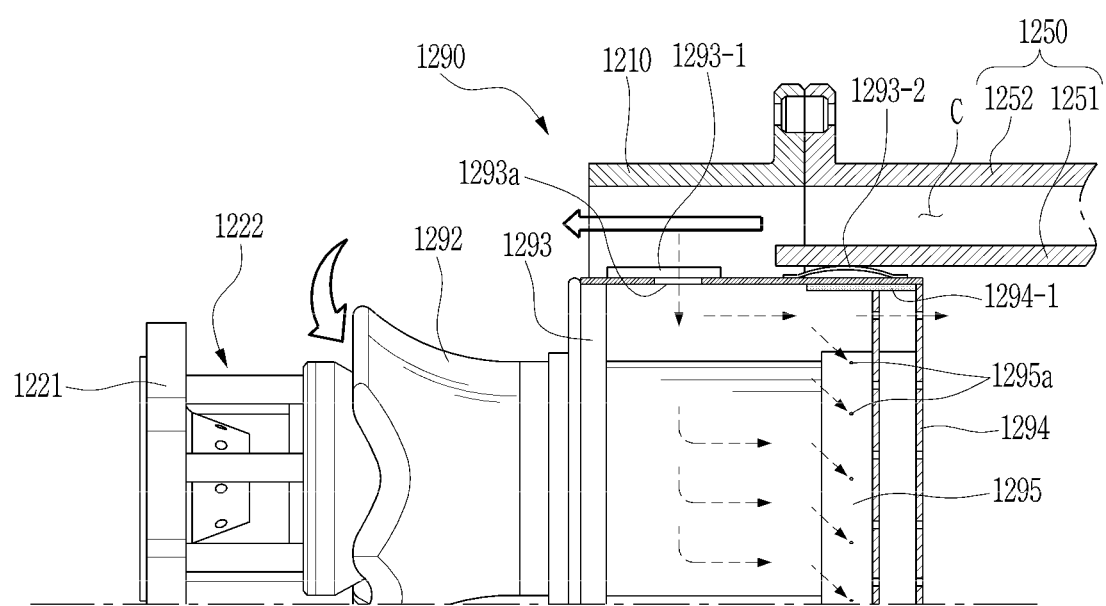
FIG. 7 is a section view for illustrating a state of operation of the combustor according to the embodiment of the present disclosure.

Referring to FIG. 7, compressed air flows in the direction of the arrow through the cooling passage C formed between the inner liner 1251 and the outer liner 1252, and is supplied into the nozzle shroud 1292 for the purpose of cooling. Meanwhile, some of the compressed air flowing into the nozzle shroud 1292 may be introduced in the direction of the vertical, dotted line arrow of FIG. 7 through the air introduction holes 1293a formed in the nozzle casing 1293. Most of the compressed air introduced through the air introduction holes 1293a is discharged to the combustion chamber 1240 through the through-holes 1294a formed in the nozzle cap 1294 to protect the nozzle part 1290 from the high-temperature combustion chamber 1240.

In the present disclosure, before the compressed air introduced through the air introduction holes 1293a is discharged through the through-holes 1294a, some of the compressed air may be introduced in the direction of the inclined, dotted line arrows through the bypass holes 1295a formed in the bypass tube 1295, and then discharged to the combustion chamber 1240 through the gap G as in FIG. 6.

The high-temperature and high-pressure combustion gas produced in the combustor 1200 in this process is supplied to the turbine 1300 through the combustion duct assembly. In the turbine 1300, the thermal energy of combustion gas is converted into mechanical energy to rotate a rotary shaft by applying impingement and reaction force to a plurality of blades radially arranged on the rotary shaft of the turbine 1300 through the adiabatic expansion of the combustion gas. Some of the mechanical energy obtained from the turbine 1300 is supplied as energy required for compression of air in the compressor, and the remainder is used as effective energy required for driving a generator to produce electric power or the like.

As described above, the combustor and the gas turbine including the same according to the present disclosure are advantageous in that the durability of the nozzle part can be enhanced by blocking the introduction of combustion gas into the nozzle part through the gap.

While the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A combustor comprising:
   a fuel injector to inject fuel;
   a cooling passage configured to pass compressed air for cooling an outer surface of a liner forming a combustion chamber for containing combustion gas; and
   a nozzle part that is coupled to the liner and has a rear surface facing the combustion chamber, the nozzle part configured to mix the compressed air with the fuel from the fuel injector and to discharge some of the compressed air in the cooling passage to the rear surface in order to block an introduction of the combustion gas into the nozzle part, the nozzle part comprising:
      a nozzle installed at one end of the fuel injector and surrounded by a nozzle shroud having an inlet end for introducing the compressed air from the cooling passage into a space in which the compressed air and the fuel are mixed, the space formed between the nozzle and the nozzle shroud;
      a nozzle casing for supporting the nozzle shroud at one end and including an open side at the other end, the nozzle casing further including a side in which an air introduction hole is formed;
      a nozzle cap installed in the open side of the nozzle casing and interposed between an outer circumferential surface of the nozzle shroud and an inner circumferential surface of the nozzle casing, the nozzle cap having a nozzle opening for receiving an outlet end of the nozzle shroud and a plurality of through-holes formed to discharge into the combustion chamber the compressed air introduced through the air introduction hole; and
      an annular bypass tube installed between the outer circumferential surface of the nozzle shroud and a circumferential surface of the nozzle opening to surround the outlet end of the nozzle shroud and to form an annular gap between the nozzle shroud and the nozzle opening, the annular bypass tube having a bypass hole formed to discharge some of the compressed air introduced through the air introduction hole,
      wherein the compressed air discharged from the bypass hole is discharged to the combustion chamber via the annular gap.

2. The combustor according to claim 1,
   wherein the annular bypass tube forms a first discharge path for the compressed air introduced through the air introduction hole, the first discharge path formed from the air introduction hole to the bypass hole, from the bypass hole to the annular gap, and from the annular gap to the combustion chamber, and
   wherein the annular bypass tube forms a second discharge path for the compressed air introduced through the air introduction hole, the second discharge path formed from the air introduction hole to the plurality of through-holes and from the plurality of through-holes to the combustion chamber.

3. The combustor according to claim 1, wherein the nozzle shroud has a tubular shape that is longer than the nozzle, and the nozzle has one end concealed within the nozzle shroud.

4. The combustor according to claim 1, wherein the nozzle part further comprises a swirler installed inside the nozzle shroud.

5. The combustor according to claim 1, further comprising a plurality of fixing brackets formed on an outer circumference of the nozzle casing to be radially coupled inside a combustor casing.

6. The combustor according to claim 1, further comprising a spring seal provided on an outer circumference of the nozzle casing to be pressed into the liner.

7. The combustor according to claim 1, wherein the air introduction hole consists of a plurality of air introduction holes circumferentially formed in the nozzle casing.

8. The combustor according to claim 1, further comprising a holder interposed between an outer circumferential surface of the nozzle cap and the inner circumferential surface of the nozzle casing to fix the nozzle cap inside the open side of the nozzle casing.

9. The combustor according to claim 1, wherein the nozzle cap has a flat surface facing the combustion chamber, and the through-holes are formed throughout the flat surface.

10. The combustor according to claim 1, wherein the annular bypass tube is supported inside the nozzle cap.

11. The combustor according to claim 1, wherein the bypass hole consists of a plurality of bypass holes circumferentially formed in the annular bypass tube.

12. The combustor according to claim 1,
    wherein the bypass hole includes an inlet communicating with an outer circumferential surface of the annular bypass tube and an outlet communicating with an inner circumferential surface of the annular bypass tube, and wherein the bypass hole is inclined from the inlet to the outlet with respect to a longitudinal direction of the bypass tube.

13. A gas turbine comprising a compressor to compress air, a combustor to produce combustion gas by mixing fuel with the compressed air and combusting the mixture, and a turbine configured to be rotated by the combustion gas to generate power, the combustor comprising:

a fuel injector to inject the fuel;

a cooling passage configured to pass the compressed air for cooling an outer surface of a liner forming a combustion chamber for containing the combustion gas; and a nozzle part comprising:

a nozzle installed at one end of the fuel injector and surrounded by a nozzle shroud having an inlet end for introducing the compressed air from the cooling passage into a space between the nozzle and the nozzle shroud in which the compressed air and the fuel are mixed;

a nozzle casing for supporting the nozzle shroud at one end and including an open side at the other end, the nozzle casing further including a side in which an air introduction hole is formed;

a nozzle cap installed in the open side of the nozzle casing between the nozzle shroud and the nozzle casing, the nozzle cap having a plurality of through-holes formed to discharge the compressed air introduced through the air introduction hole; and a nozzle cap installed in the open side of the nozzle casing and interposed between an outer circumferential surface of the nozzle shroud and an inner circumferential surface of the nozzle casing, the nozzle cap having a nozzle opening for receiving the outlet end of the nozzle shroud and a plurality of through-holes formed to discharge into the combustion chamber the compressed air introduced through the air introduction hole; and an annular bypass tube installed between the outer circumferential surface of the nozzle shroud and a circumferential surface of the nozzle opening to surround the outlet end of the nozzle shroud and to form an annular gap between the nozzle shroud and the nozzle opening, the annular bypass tube having a bypass hole formed to discharge some of the compressed air introduced through the air introduction hole, wherein the compressed air discharged from the bypass hole is discharged to the combustion chamber via the annular gap.

14. The gas turbine according to claim 13, wherein the nozzle shroud has a tubular shape that is longer than the nozzle, and the nozzle has one end concealed within the nozzle shroud.

15. The gas turbine according to claim 13, wherein the combustor further comprises a plurality of fixing brackets formed on an outer circumference of the nozzle casing to be radially coupled inside a combustor casing.

16. The gas turbine according to claim 13, wherein the combustor further comprises a spring seal provided on an outer circumference of the nozzle casing to be pressed into the liner.

17. The gas turbine according to claim 13, wherein the air introduction hole consists of a plurality of air introduction holes circumferentially formed in the nozzle casing.

18. The gas turbine according to claim 13, wherein the combustor further comprises a holder interposed between an outer circumferential surface of the nozzle cap and the inner circumferential surface of the nozzle casing to fix the nozzle cap inside the open side of the nozzle casing, and wherein the nozzle cap has a flat surface facing the combustion chamber, and the through-holes are formed throughout the flat surface.

19. The gas turbine according to claim 13, wherein the bypass tube is supported inside the nozzle cap.

20. The gas turbine according to claim 13, wherein the bypass hole consists of a plurality of bypass holes circumferentially formed in the bypass tube.

* * * * *